US009659591B1

United States Patent
Peng

(10) Patent No.: US 9,659,591 B1
(45) Date of Patent: *May 23, 2017

(54) POLYNOMIAL SPIRAL WAVEGUIDE THAT FACILITATES COUPLING LIGHT TO A NEAR-FIELD TRANSDUCER AT AN OBLIQUE ANGLE

(71) Applicant: Seagate Technology LLC, Cupertino, CA (US)

(72) Inventor: Chubing Peng, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/995,754

(22) Filed: Jan. 14, 2016

(51) Int. Cl.
| | | |
|---|---|---|
| G11B 11/00 | (2006.01) | |
| G11B 5/48 | (2006.01) | |
| G11B 5/00 | (2006.01) | |
| G11B 7/1387 | (2012.01) | |
| G11B 11/105 | (2006.01) | |
| G11B 5/60 | (2006.01) | |

(52) U.S. Cl.
CPC .......... *G11B 5/4866* (2013.01); *G11B 5/6088* (2013.01); *G11B 7/1387* (2013.01); *G11B 11/1051* (2013.01); *G11B 11/10506* (2013.01); *G11B 11/10536* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 2,914,741 A | 11/1959 | Unger | |
| 5,200,939 A | 4/1993 | Nishiwaki et al. | |
| 6,388,840 B1 | 5/2002 | Ohwe | |
| 8,670,294 B1* | 3/2014 | Shi | G11B 5/314 360/59 |
| 8,670,295 B1* | 3/2014 | Hu | G11B 5/105 369/13.13 |
| 8,861,124 B1* | 10/2014 | Finot | G11B 5/3133 360/59 |
| 9,251,819 B2* | 2/2016 | Peng | G11B 5/1278 |
| 9,336,814 B1* | 5/2016 | Shi | G11B 13/04 |
| 2008/0204916 A1* | 8/2008 | Matsumoto | G11B 5/314 360/59 |
| 2010/0238580 A1* | 9/2010 | Shimazawa | G11B 5/314 360/59 |

(Continued)

OTHER PUBLICATIONS

Aug. 4, 2016, File History for U.S. Appl. No. 14/928,611.

*Primary Examiner* — Tan X Dinh
(74) *Attorney, Agent, or Firm* — Hollingsworth Davis, LLC

(57) ABSTRACT

A recording head includes a near-field transducer located an oblique angle to a media-facing surface. The near-field transducer includes an enlarged portion and a peg extending from the enlarged portion towards the media-facing surface at a normal angle. An input waveguide of the recording head receives energy from an energy source, and an output waveguide delivers the energy to near-field transducer at the oblique angle. The output waveguide is oriented at the oblique angle. A bent waveguide with a polynomial spiral shape joins the input waveguide and the output waveguide.

20 Claims, 11 Drawing Sheets

(56) References Cited

U.S. PATENT DOCUMENTS

| | | | | |
|---|---|---|---|---|
| 2011/0122737 A1* | 5/2011 | Shimazawa | G11B 5/314 | 369/13.24 |
| 2011/0181979 A1* | 7/2011 | Jin | G11B 5/314 | 360/59 |
| 2013/0223196 A1* | 8/2013 | Gao | G11B 5/6088 | 369/13.24 |
| 2014/0036646 A1* | 2/2014 | Peng | G11B 13/08 | 369/13.33 |
| 2014/0241137 A1 | 8/2014 | Jin et al. | | |
| 2014/0254336 A1* | 9/2014 | Jandric | G02B 6/1226 | 369/13.33 |
| 2014/0325827 A1 | 11/2014 | Lipson et al. | | |
| 2015/0003218 A1* | 1/2015 | Peng | G11B 5/4866 | 369/13.17 |
| 2015/0109822 A1 | 4/2015 | Ouderkirk | | |
| 2015/0318005 A1* | 11/2015 | Kim | G11B 5/4866 | 369/13.32 |
| 2015/0340050 A1* | 11/2015 | Wessel | G02B 6/1226 | 369/13.33 |
| 2016/0125901 A1* | 5/2016 | Lee | G11B 5/3133 | 369/13.33 |
| 2016/0133286 A1* | 5/2016 | Lee | G11B 5/4866 | 369/13.33 |
| 2016/0300589 A1* | 10/2016 | Chen | G11B 5/314 | 369/13.33 |
| 2016/0351209 A1* | 12/2016 | Chen | G11B 5/314 | 369/13.33 |
| 2016/0351210 A1* | 12/2016 | Blaber | G11B 5/6082 | 369/13.33 |
| 2016/0351211 A1* | 12/2016 | Blaber | G11B 5/314 | 369/13.33 |
| 2016/0351214 A1* | 12/2016 | Kautzky | G11B 5/3169 | 369/13.33 |
| 2016/0351221 A1* | 12/2016 | Blaber | G11B 5/6082 | 369/13.33 |
| 2016/0351222 A1* | 12/2016 | Blaber | G11B 5/6082 | 369/13.33 |

\* cited by examiner

Section 4-4

Section 5-5

POLYNOMIAL SPIRAL WAVEGUIDE THAT FACILITATES COUPLING LIGHT TO A NEAR-FIELD TRANSDUCER AT AN OBLIQUE ANGLE

SUMMARY

The present disclosure is related to a polynomial spiral waveguide that facilitates coupling light to a near-field transducer at an oblique angle. In one embodiment, a recording head includes a near-field transducer located an oblique angle to a cross-track line at an intersection of a media-facing surface and a substrate-parallel plane of the recording head. The near-field transducer includes an enlarged portion and a peg extending from the enlarged portion towards the media-facing surface. The peg is at a normal angle to the cross-track line. An input waveguide of the recording head receives energy from an energy source along the substrate parallel plane, and an output waveguide delivers the energy to near-field transducer at the oblique angle. The output waveguide is oriented at the oblique angle to the cross track line. A bent waveguide with a polynomial spiral shape joins the input waveguide and the output waveguide.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures. The figures are not necessarily to scale.

DETAILED DESCRIPTION

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, information bits are recorded in a storage layer at elevated temperatures. The heated area (e.g., hot spot) in the storage layer determines the data bit dimension. One way to achieve a tiny, confined hot spot is to use an optical near-field transducer (NFT), such as a plasmonic optical antenna or an aperture, integrated in an optical waveguide of high contrast in the index of refraction between the waveguide core and its claddings. A magnetic pole is placed in close proximity (e.g., 20-50 nm) to the NFT at the media-facing surface.

One way to launch light into the optical waveguide on a magnetic slider is to bond a light source on a top surface of the slider. Light exiting from a light source, for instance, an edge-emitting laser diode, is coupled into a slider-integrated optical waveguide by an input coupler. Light is delivered to a near-field transducer of the slider by a solid immersion mirror or by a channel waveguide. To achieve better product yields, a channel waveguide that supports only a single transverse mode may be used for light delivery. A laser diode with transverse electric (TE) mode may be selected as a light source for use with this type of waveguide. Transverse electric mode lasers are more commonly available and therefore provide greater choice in laser emission wavelength than that of a transverse magnetic (TM) mode laser.

Part of the light delivered by the channel waveguide the recording media will reflect from the media and return into the light source. The reflected light can cause laser instability, such as longitudinal mode hopping. In order to reduce these reflections, a largely tilted channel waveguide with fundamental transverse electric ($TE_{00}$)) mode for light delivery to prevent optical feedback and thereby increase laser stability. The NFT footprint is much smaller than that for the waveguide light delivery with the first higher-order mode, $TE_{10}$ mode, which can thereby reduce peg recess of the NFT. A light path design is described below that has low propagation loss, low reflection, and reduced sensitivity to waveguide sidewall roughness.

Figure 1:
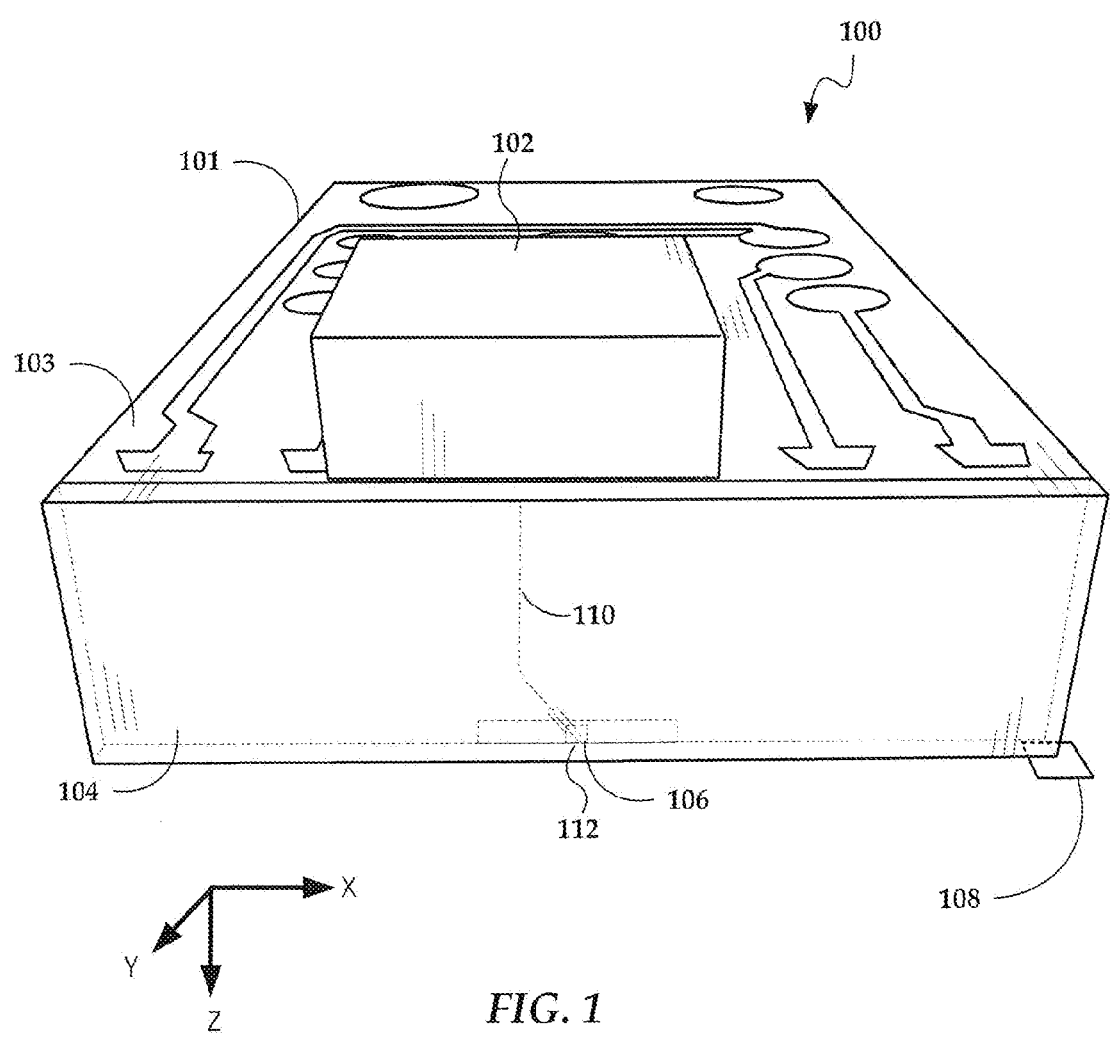
FIG. 1 is a perspective view of a slider assembly according to an example embodiment.

In reference to FIG. 1, a perspective view shows a HAMR recording head 100 according to an example embodiment. The recording head 100 may also be referred to as a slider, read head, write head, read/write head, etc. The recording head 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers light to a region proximate a HAMR read/write transducer 106, which is located near the media-facing surface 108. The energy is used to heat the recording media as it passes by the read/write transducer 106. Optical coupling components, such as a waveguide system 110, are formed integrally within the slider body 101 (near a trailing edge surface 104 in this example) and function as an optical path that delivers energy from the laser diode 102 to the recording media via a near-field transducer 112. The near-field transducer 112 is located near the read/write transducer 106 and causes heating of the media during recording operations. The near-field transducer 112 may be made from plasmonic materials such as gold, silver, copper, rhodium, platinum, iridium, etc.

The laser diode 102 in this example may be configured as either an edge-emitting laser or surface-emitting laser. Generally, the edge-emitting laser, also called in-plane laser, emits light along the wafer surface of a semiconductor chip and a surface emitting laser emits light in a direction perpendicular to a semiconductor wafer surface. An edge-emitting laser may be mounted on the top surface 103 of the slider body 101 (e.g., in a pocket or cavity) such that the light is emitted in a direction perpendicular to the media-facing surface (along the z-direction in this view).

While the example in FIG. 1 shows a laser diode 102 directly mounted to the slider body 101, the waveguide system 110 discussed herein may be applicable to any type of light delivery configuration. For example, a laser may be joined to the top surface 103 by way of a submount or other intermediate structure. The mounting surface 103 of the slider body 101 may include a mirror, lens, grating or other coupling feature to receive light from the laser 102.

Figure 2:
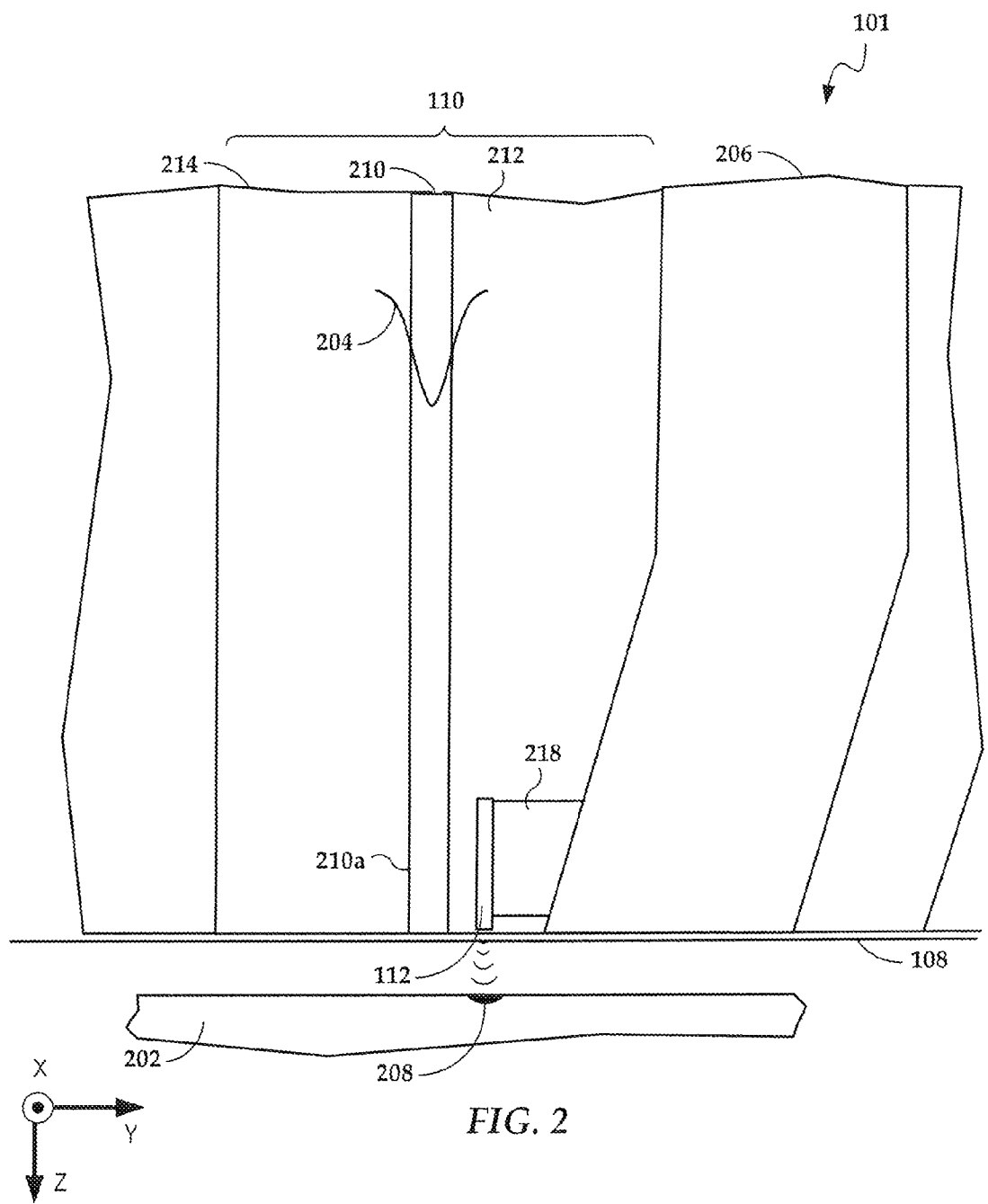
FIG. 2 is a cross-sectional view illustrating details of a light path according to an example embodiment.

In FIG. 2, a cross-sectional view illustrates portions of the slider body 101 near the near-field transducer 112 according to an example embodiment. In this view, the near-field transducer 112 is shown proximate to a surface of magnetic recording medium 202, e.g., a magnetic disk. The waveguide system 110 delivers electromagnetic energy 204 to the near-field transducer 112, which directs the energy 204 to create a small hot spot 208 on the recording medium 202. A magnetic write pole 206 causes changes in magnetic flux near the media-facing surface 108 in response to an applied current. Flux from the write pole 206 changes a magnetic orientation of the hot spot 208 as it moves past the write pole 206 in the down track direction (y-direction).

The waveguide system 110 includes a core layer 210 surrounded by cladding layers 212, 214. The core layer 210 may be made from dielectric of high index of refraction, for instance, $Ta_2O_5$ (tantalum oxide), $TiO_2$ (titanium oxide), $Nb_2O_5$ (niobium oxide), $Si_3N_4$ (silicon nitride), SiC (silicon carbon), $Y_2O_3$ (yttrium oxide), ZnSe (zinc selenide), ZnS (zinc sulfide), ZnTe (zinc telluride), $Ba_4Ti_3O_{12}$ (barium titanate), GaP (gallium phosphide), $CuO_2$ (copper oxide), and Si (silicon), etc. The cladding layers 212, 214 may each be formed of a dielectric material having a refractive index lower than the core, such as $Al_2O_3$ (aluminum oxide), SiO, $SiO_2$ (silica), SiOxNy (silicon oxynitride), and AlN (aluminum nitride). This arrangement of materials facilitates efficient propagation of light through the waveguide system 110. The waveguide system 110 may include any combination of geometric features described in subsequent figures.

A first end of the core 210 (not shown) extends along the light propagation direction (z-direction) where it is directly or indirectly coupled to a light/energy source. For example, a laser diode may have an output facet that is coupled face-to-face with an end of the waveguide core 210. In other configurations, optical components such as lenses, mirrors, collimators, mode converters, etc., may be coupled between the waveguide core 210 and the light/energy source. In either case, the energy 204 coupled into the first end of the waveguide core 210 propagates to a second end 210a that is proximate the near-field transducer.

Figure 3:
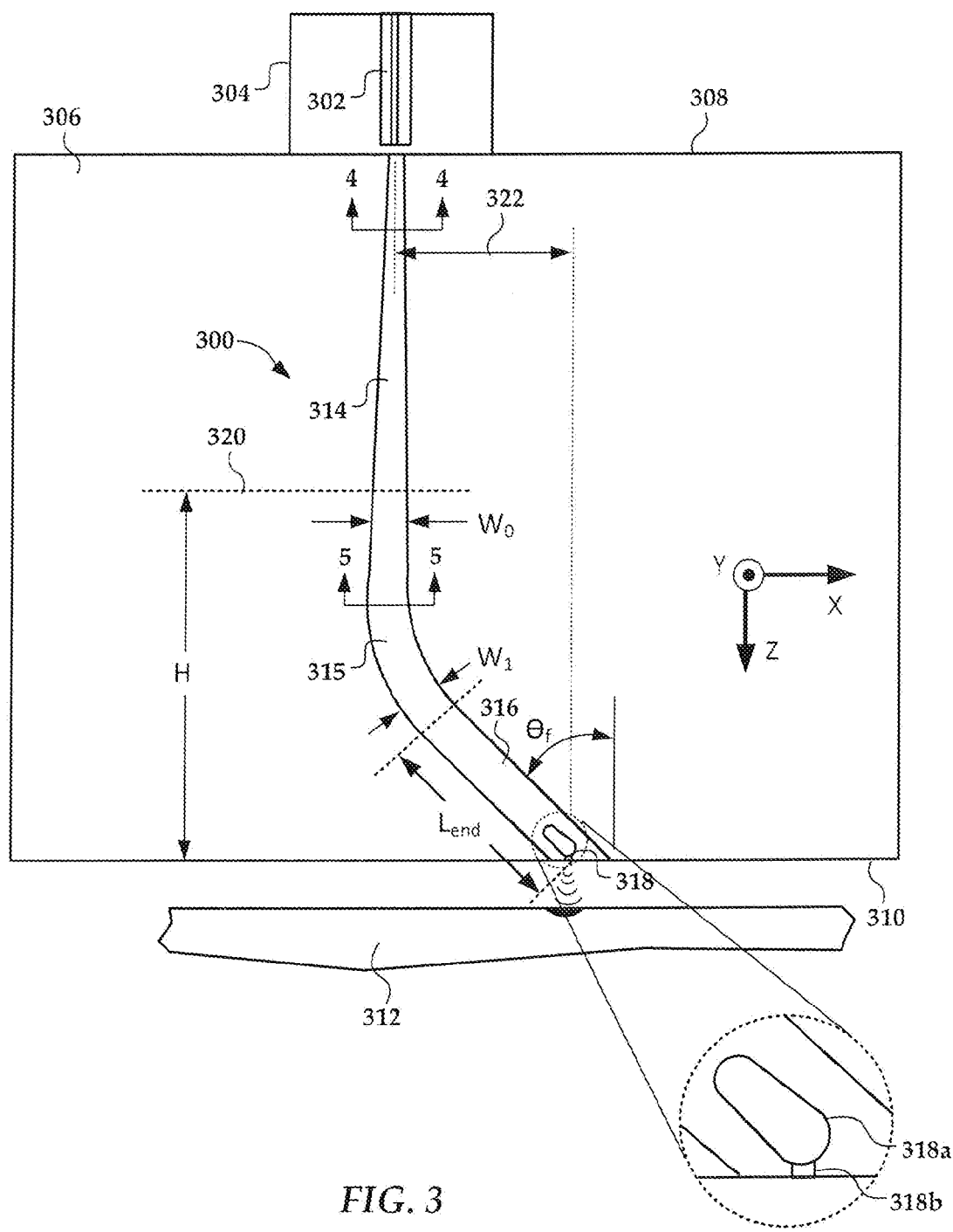
FIG. 3. is a substrate-parallel plane view showing geometry of a slider-integrated waveguide system according to an example embodiment.

In FIG. 3, a substrate-parallel plane view shows geometry of a slider-integrated waveguide system 300 according to an example embodiment. An energy source 302, e.g., an edge-emitting laser diode, is mounted on a submount 304. The submount 304 is on a top surface 308 of a slider body 306. The top surface 308 is opposite a media-facing surface 310, which is held near a magnetic recording medium 312 while recording data.

The energy source 302 launches light into a tapered waveguide input coupler 314 (also referred to as an "input waveguide") of the waveguide system. The energy source 302 is polarized along the x-direction, exciting a fundamental transverse electric mode ($TE_{00}$) in the waveguide input coupler 314, which is coupled to a bent waveguide 315 and an output waveguide 316. The input coupler 314 tapers from a smaller cross track width proximate the energy source 302 to a wider cross track width proximate the bent waveguide 315. The waveguide core dimension of input and output waveguides 314-316 may be chosen to support single mode propagation.

Figure 4:
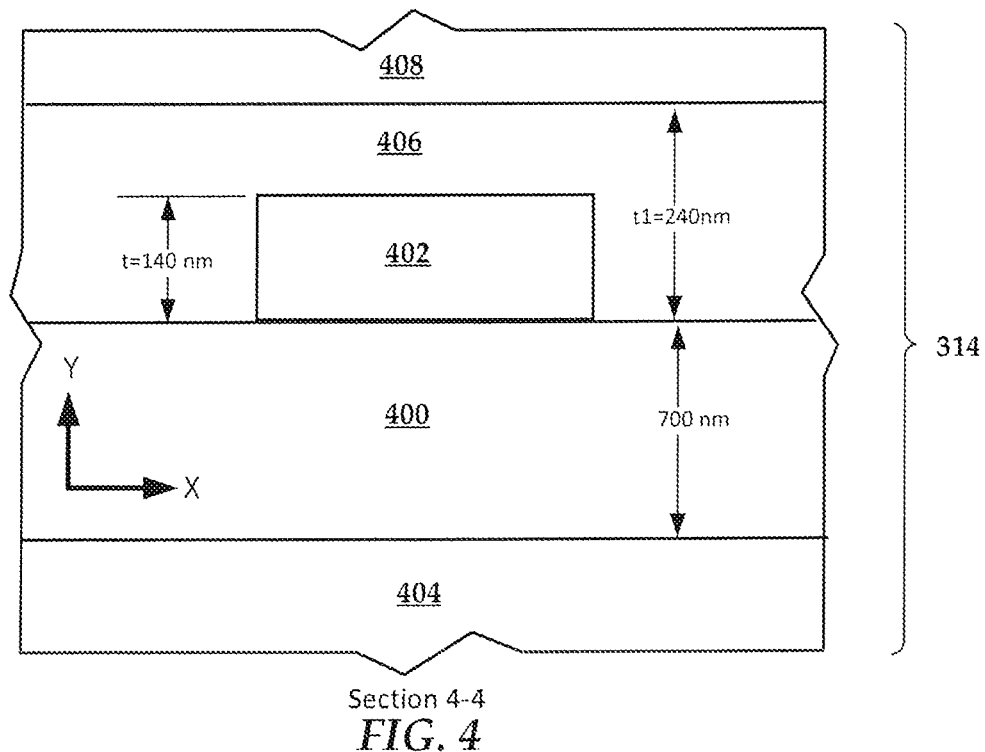
FIG. 4 is a cross-sectional view corresponding to section 4-4 of FIG. 3.

As seen in FIG. 4, which corresponds to section line 4-4 through the input waveguide 314 in FIG. 3, a coupling assistant layer 400 (e.g., silicon oxynitride, n=1.70) located underneath or above the waveguide core 402 (e.g., $Ta_2O_5$, n=2.065), e.g., adjacent a substrate parallel side of the waveguide core 402. The coupling assistant layer 400 may be used to match the mode profile between the energy source and the input waveguide 314 at the laser source/waveguide interface for efficient coupling from light source to waveguide. Also seen in FIG. 4 are bottom cladding 404 (e.g., alumina, n=1.65), side cladding 406 (e.g., $Al_2O_3$, n=1.63), and top cladding 408 (e.g., silica, n=1.46). The dimensions shown in FIG. 4 are provided for purposes of illustration and not limitation.

Referring again to FIG. 3, light propagates through the bent waveguide 315 and the output waveguide 316 and eventually excites a plasmonic NFT 318. The NFT 318 is located an oblique angle (e.g., angle $\theta_f$) to a cross-track line (e.g., aligned with x-axis in this view) at an intersection of the media-facing surface 310 and a substrate-parallel plane (e.g., xz-plane in this view) of the slider body 308. The NFT 318 includes an enlarged portion 318a and a peg 318b extending from the enlarged portion 318a towards the media-facing surface 310. The peg 318b is located at a normal angle to the cross-track line. The NFT 318 concentrates optical energy into a tiny spot on the recording medium 312 well below far-field diffraction limit. The energy heats the recording medium 312 during writing while a magnetic field from a magnetic pole (not shown) switches direction according to an encoded data signal.

The input waveguide 314 is nearly normal to the top surface 308, and light exiting from the light source 302 is nearly normal to this surface for coupling efficiency from the energy source 302 to the waveguide 314. The output waveguide 316 near the media-facing surface is tilted from the media-facing surface normal at a large angle $\theta_f$ to suppress the return light reflected from the medium 312 into the light source 302, which may cause instability, such as laser mode hopping.

Figure 5:
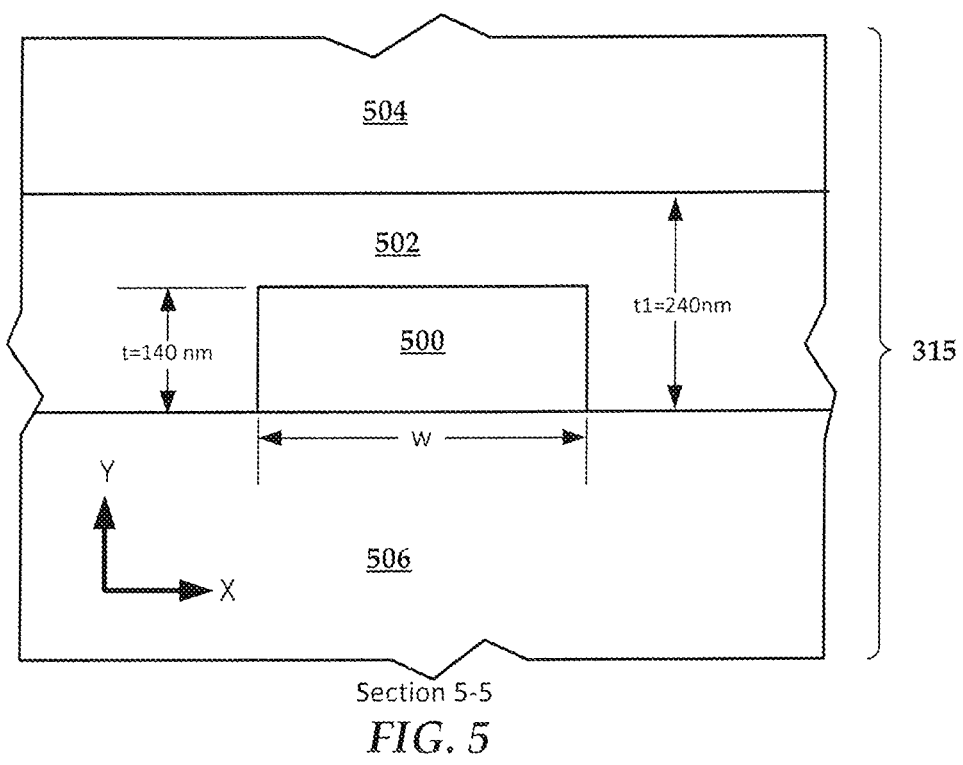
FIG. 5 is a cross-sectional view corresponding to section 5-5 of FIG. 3.

The bent waveguide 315 connects the input and output waveguides 314, 316 and has high transmission with low reflection. The waveguide geometry results in an offset 322 between the laser output and the NFT 318. An example core and cladding configuration of the bent waveguide 315 is shown in the cross-section of FIG. 5, which corresponds to section line 5-5 of FIG. 3. The bent waveguide 315 includes a 140-nm thick dielectric $Ta_2O_5$ core 500 of width W, conformally covered with a 100 nm thick alumina ($Al_2O_3$) side cladding layer 502, and is then cladded by a silica ($SiO_2$) top cladding layer 504 and silica bottom cladding layer 506. The core 500 has index of refraction n=2.065, and that of $Al_2O_3$ n=1.63, and that of silica n=1.46. It will be understood that, while components in FIGS. 4 and 5 may be given different reference numbers (e.g., side cladding 406 and side cladding 502), such components may be formed contiguously on a slider substrate.

Figure 6:
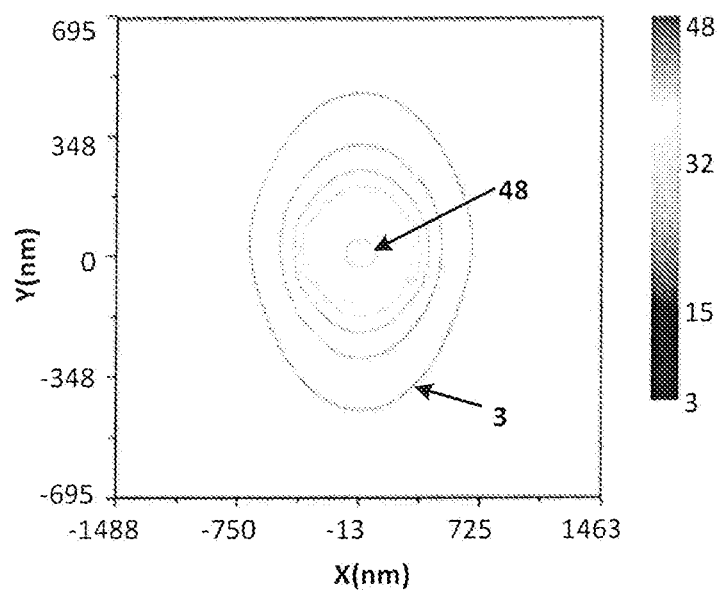
FIGS. 6 and 7 are contour plots of field amplitudes of a waveguide system according to an example embodiment.
Figure 7:
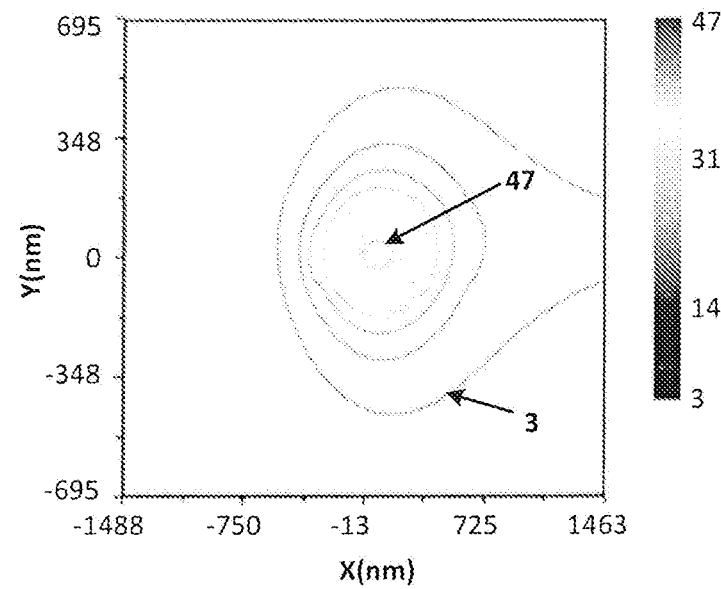

There are two physical loss mechanisms considered for this waveguide system 300: transition loss and pure bending loss. Transition loss occurs at a discontinuity between two waveguide sections of different curvatures, for instance, between a straight and a bent section, due to mode field mismatch and lateral offset in the peak field, causing radiation loss and excitations of other order modes. The contour plots in FIGS. 6 and 7 show a comparison of a $TE_{00}$ mode field amplitude between a straight and bent waveguide, respectively (light wavelength in free space $\lambda=0.83$ µm). The $Ta_2O_5$ core is W=0.6 µm wider. The bent waveguide has a radius of curvature R=10 µm. In FIG. 7, the positive X-axis points to the outer bend contour. It is evident that the mode profile of the bent waveguide is deformed and there is a tail toward the outer bend contour and side cladding. Because the straight waveguide (e.g., waveguides 314 and 316 in FIG. 3) is connected with the bent waveguide (e.g., waveguide 315 in FIG. 3), there will be radiation loss, called transition loss, due to mode mismatch between the two waveguides 314 and 315 as well as 315 and 316.

Figure 8:
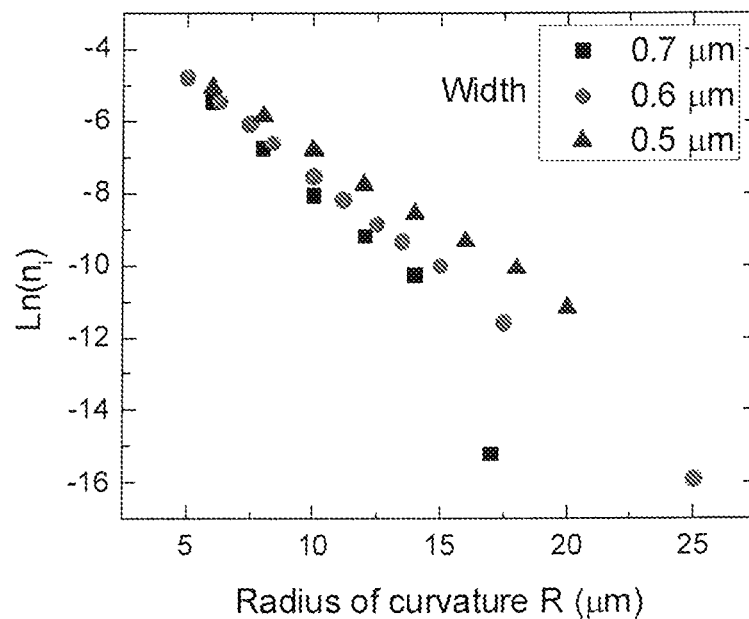
FIGS. 8 and 9 are plots of the logarithm of the imaginary part ($n_i$) in the effective mode index and mode field overlap between a bent and straight waveguide section according to an example embodiment.
Figure 9:
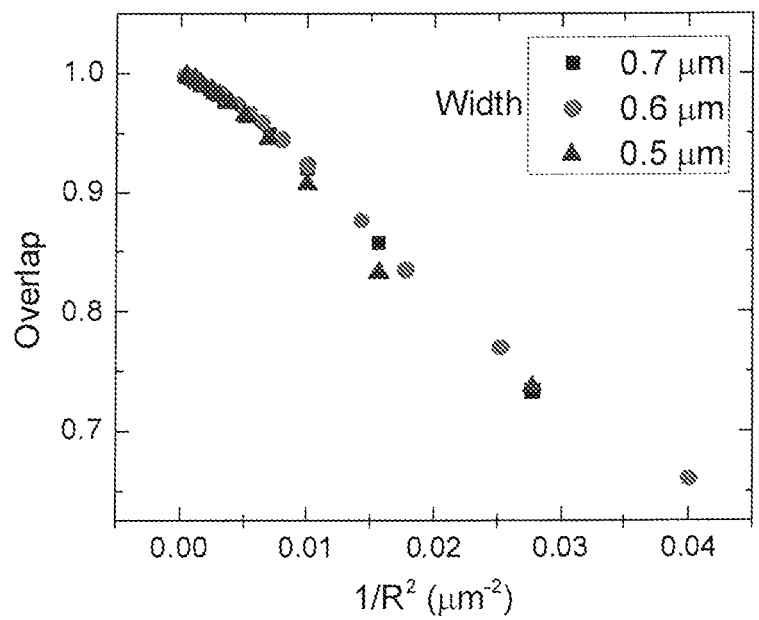

Pure bending loss is a result of radiation loss due to phase wave-front deformation. The graphs in FIGS. 8 and 9 show the logarithm of the imaginary part ($n_i$) in the effective mode index and mode field overlap between a bent and straight waveguide section for the fundamental transverse electric mode ($TE_{00}$)) as a function of radius of curvature, R. In dB/µm, the pure bending loss is to proportional to $$\alpha_B = 10\log_{10}e \times \frac{4\pi n_i}{\lambda_0 (\text{in µm})}.$$

Transition loss at a discrete discontinuity: $\alpha_T=1-$overlap. As expected, smaller bend radius results in larger bending and transition losses. Wider waveguides exhibit lower bending loss. This trend is not that clear for the transition loss. For the waveguide geometry in FIG. 5, as the core is wider than 0.7 µm, it supports two TE modes, e.g., the fundamental $TE_{00}$ and the first-higher order mode, $TE_{10}$.

There is another waveguide loss caused by imperfect fabrication, namely the waveguide sidewall roughness. The roughness-induced radiation loss is dependent on the field amplitude at the waveguide sidewalls, which prefers wider waveguide for better mode confinement. But wider waveguide supports multi-modes and inter-mode coupling due to bending will cause power loss. As such, suppressing inter-mode coupling will allow a wide waveguide bend to mitigate roughness-induced radiation loss.

Another aspect is the reflection at the discontinuity between two waveguide sections. Reflection back to the laser cavity will cause mode hopping, resulting in fluctuations and jump in laser output power. One method to minimize transition loss is lateral shift between two waveguide sections. From FIGS. 8 and 9, it is evident that $Ln(n_i)$ is nearly linearly dependent on the radius of curvature: $n_i = n_{i0}e^{-mR}$. For the waveguide shown in FIG. 5, at core width W=0.6 µm, fitting yields $n_{i0}$=0.142 and m=0.553 (µm)$^{-1}$.

Transition loss could be understood as the coupling to other propagating modes, leaky modes, and radiation modes. Considering the coupling from mode i of segment 0 to mode j of the connected segment 1. The amplitude coupling coefficient $c_{ij}$ due to the change in waveguide structure from segment 0 to 1 can be written as shown in Equation [1] below, where $k_0$ denotes the wave number in free space ($k_0=2\pi/\lambda_0$); $\Delta\epsilon_r$ stands for the change in the relative permittivity between the two segments; $E_{i0}$ represents the spatial field profile of mode i of segment 0 and $E^*_{j1}$ the complex conjugate of the mode field of mode j of segment 1; $\beta_{i0}$ is the propagation constant of mode i of segment 0; and $\beta_{j1}$ is that of mode j of segment 1.

$$c_{ij} = \frac{k_0 \int\int \Delta\epsilon_r \vec{E}_{i0} \cdot \vec{E}^*_{j1} dxdy}{8\Delta\beta_{ij}}, \Delta\beta_{ij} = (\beta_{j1} - \beta_{i0}) \quad [1]$$

The spatial field profile has been normalized to have unit power. It is seen that inter-mode coupling mainly occurs between two neighboring modes. Let $a_i$ ($a_j$) be the field amplitude in mode i (mode j), the change in the mode amplitude ($\Delta a_i$, $\Delta a_j$) is written as in Equation [2] below, and in continuous form in Equations [3a]-[3c].

$$\Delta a_j = c_{ij} a_i, \Delta a_i = -c_{ij} a_j \quad [2]$$

$$\frac{da_j}{dz} = c_{ij} a_i \exp\left[i \int \Delta\beta_{ij} dz'\right] \quad [3a]$$

$$\frac{da_i}{dz} = -c_{ij} a_j \exp\left[-i \int \Delta\beta_{ij} dz\right] \quad [3b]$$

$$c_{ij} = \frac{k_0 \int\int \frac{d\epsilon_r}{dz} \vec{E}_{i0} \cdot \vec{E}^*_{j1} dxdy}{8\Delta\beta_{ij}} \quad [3c]$$

If a mode is well confined to waveguide core, a bent waveguide can be approximated with a straight waveguide with a permittivity of $$\left(1+\frac{x}{R}\right)^2 \epsilon_r(x,y) \approx \left(1+2\frac{x}{R}\right)\epsilon_r(x,y) = (1+2\kappa x)\epsilon_r(x,y).$$

Here $\kappa$ denotes the curvature, $\kappa=1/R$. The coupling coefficient $c_{ij}$ of Equation [3c] becomes Equation [4] below. To the second order in the coupling, assuming $a_j(0)=0$, the coupling from mode i to j, can be obtained as shown in Equation [5]. If the coupling coefficient $c_{ij}$ and $\Delta\beta_{ij}$ do not change with z, the power loss from mode i to j is shown in Equation [6].

$$c_{ij} = \frac{k_0 \int\int \frac{d\kappa}{dz} x \vec{E}_{i0} \cdot \vec{E}^*_{j1} dxdy}{4\Delta\beta_{ij}} \quad [4]$$

$$a_j(z) \approx a_i(0) \int_0^z dz' c_{ij} \exp\left[i \int_0^{z'} \Delta\beta_{ij} dz''\right] \quad [5]$$

$$\left(\frac{a_j(z)}{a_i(0)}\right)^2 \approx |c_{ij}|^2 \frac{4\sin^2\left(\frac{\Delta\beta}{2}z\right)}{(\Delta\beta)^2} \quad [6]$$

It is interesting to see that if mode j is a propagating mode, the power in mode i will be oscillating. If the waveguide supports only a single mode, however, the power in mode i will loss to radiation modes. Based on Equations [3c] and [6], we may approximate the change in transition loss $\alpha_T$ as shown in Equation [7] below. Combining the pure bending and transition loss, we obtain the total loss along a bend path as shown in Equation [8], where s denotes the arc length along the path contour and $s_1$ is the total arc length.

$$\frac{d\alpha_T}{dz} \approx c_2 \left(\frac{d\kappa}{dz}\right)^2 \quad [7]$$

$$\Gamma = \int_0^{s_1} (\alpha_B + \alpha_T) ds = \int_0^{s_1} \left[ c_1 e^{-m/|\kappa|} + c_2 \left(\frac{d\kappa}{ds}\right)^2 \right] ds \quad [8]$$

To verify the transition loss model presented in Equation [7], the transition loss due to the change in the radius of curvature, $\Delta R$, versus R is computed. According to Equations [1] and [2], the transition loss is approximately proportional to $$(\Delta\varepsilon_r)^2 \propto (\Delta\kappa)^2 = (\Delta R/R)^2 \frac{1}{R^2}.$$

Figure 10:
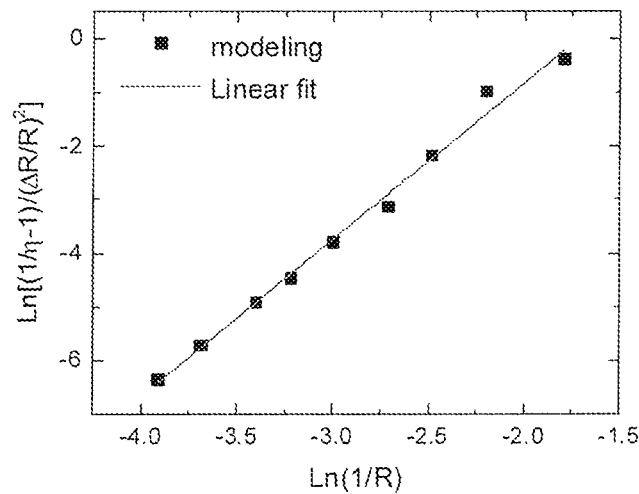
FIG. 10 is a graph showing verification of a transition loss model due to the change in radius of curvature of a bent waveguide according to an example embodiment.

The graph in FIG. 10 shows the logarithm plot of $(1-\text{overlap})/(\Delta R/R)^2$ versus $1/R$ for core width W=0.6 μm and was used to verify the transition loss model due to the change in radius of curvature, $\Delta R$. Linear fitting yields the transition loss $$= (1 - \text{overlap}) \propto (\Delta R/R)^2 \frac{1}{R^n}, n = 2.926,$$

which is about 50% off from the simplified model, n=2.

The bend path optimization involves minimizing the loss $\Gamma$ with constraint in endpoints as shown in Equation [9] below. Adding the Lagrange multipliers ($\lambda_1, \lambda_2$), bend path optimization involves minimizing the functional $\Gamma$ as shown in Equation [10]. According to the calculus of variation, Equation [11] is obtained.

$$\begin{pmatrix} z_f \\ x_f \end{pmatrix} = \begin{pmatrix} z_0 \\ x_0 \end{pmatrix} + \int_0^{s_1} \begin{pmatrix} \cos\theta \\ \sin\theta \end{pmatrix} ds \quad [9]$$

$$\Gamma = \int_0^{s_1} F\left[\kappa(s), \frac{d\kappa}{ds}(s), s\right] ds$$

$$F\left[\kappa(s), \frac{d\kappa}{ds}(s), s\right] = c_1 e^{-m/|\kappa|} + c_2 \left(\frac{d\kappa}{ds}\right)^2 + \lambda_1 \cos\theta + \lambda_2 \sin\theta \quad [10]$$

$$mc_1 e^{-m/|\kappa|} \frac{\text{sign}(\kappa)}{\kappa^2} - 2c_2 \frac{d^2\kappa}{ds^2} - (\lambda_1 \sin\theta - \lambda_2 \cos\theta)\kappa = 0 \quad [11]$$

It is difficult to find the solution of Equation [11] with the end-point constraints given in Equation [9], and so an approximate solution is sought. Generally, a straight path connecting the two end-points will minimize pure bending loss. However, this path will cause reflection at the discontinuity between two waveguide sections. Reflection back to the laser cavity will cause mode hopping, resulting in fluctuations and jumps in laser output power. As such, the goal is to minimize transition loss in the curved path.

Without endpoint constraint, the minimization in the transition loss means $$\frac{d^2\kappa}{ds^2} = 0,$$

which leads to Euler spiral or clothoid spiral, $\kappa(s)=a+bs$. With endpoint constraints, one approximate path is polynomial spiral shown in Equation [12] below.

$$\kappa(s) = a + bs + cs^2 + ds^3 \quad [12]$$

The four parameters (a, b, c, d) can be uniquely determined by requiring continuity in tangent angle and curvature at the two endpoints and constraint in endpoint coordinates. The input and output waveguide are straight. Curvature continuity at the start point leads to a=0 and curvature continuity at the end point leads to $b = -(c\,s_1 + d\,s_1^2)$. The tangent angle is $\theta(s) = \theta_0 + \frac{1}{2}b\,s^2 + \frac{1}{3}c\,s^3 + \frac{1}{4}d\,s^4$ and tangent angle continuity at the end point results in $$\theta_f = \theta(s = s_1) = \theta_0 + \frac{1}{2}b s_1^2 + \frac{1}{3}c s_1^3 + \frac{1}{4}d s_1^4.$$

Combine these, (b, c) can be expressed in terms of (d, $s_1$) as shown in Equations [13a]-[13b] below. The two parameters (d, $s_1$) are determined by the endpoint constraint, Equation [9], which can be rewritten as in Equation [14].

$$b = \frac{1}{2}d s_1^2 + \frac{6(\theta_f - \theta_0)}{s_1^2} \quad [13a]$$

$$c = -\frac{3}{2}d s_1 - \frac{6(\theta_f - \theta_0)}{s_1^3} \quad [13b]$$

$$(z_f - z_0) + i(x_f - x_0) = \int_0^{s_1} e^{i\theta(s)} ds \quad [14]$$

The procedure to find the two parameters (d, $s_1$) from Equation [14] involves three steps for numerical integration. For the first step, the integral in Eq. [14] is rewritten as shown in Equations [15a]-[15g] below.

$$\int_{s_0}^{s_1} e^{i\theta(s)} ds = \quad [15a]$$

$$(s_1 - s_0) e^{i\left[\theta_0 + s_m\left(a + \frac{b}{2}s_m + \frac{c}{3}s_m^2 + \frac{d}{4}s_m^3\right)\right]} \int_{-0.5}^{0.5} dt\, e^{i(k_0 t + k_1 t^2 + k_2 t^3 + k_3 t^4)}$$

$$\int_{-0.5}^{0.5} dt\, e^{i(k_0 t + k_1 t^2 + k_2 t^3 + k_3 t^4)} = 2 \int_0^{0.5} dt\, \cos(k_0 t + k_2 t^3) e^{i(k_1 t^2 + k_3 t^4)} \quad [15b]$$

$$s_m = \frac{s_1 + s_0}{2} \quad [15c]$$

$$k_0 = (s_1 - s_0)(a + b s_m + c s_m^2 + d s_m^3) \quad [15d]$$

$$k_1 = (s_1 - s_0)^2 \left(\frac{b}{2} + c s_m + \frac{3d}{2} s_m^2\right) \quad [15e]$$

$$k_2 = (s_1 - s_0)^3 \left(\frac{c}{3} + d s_m\right) \quad [15f]$$

$$k_3 = (s_1 - s_0)^4 d/4 \quad [15g]$$

Second, at a given total arc length $s_1$, $s_1 > s_{1min} = \sqrt{(z_f - z_0)^2 + (x_f - x_0)^2}$, the corresponding d with the constraint in ($x_f$-$x_0$) is found as in Equation [16] below. To find the root, d, of Equation [16], the integration in Equation [14] is approximated based on Equation [15a], $$\int_{s_0}^{s_1} e^{i\theta(s)} ds \approx (s_1 - s_0) e^{i\left[\theta_0 + s_m\left(a + \frac{b}{2}s_m + \frac{c}{3}s_m^2 + \frac{d}{4}s_m^3\right)\right]},$$

thereby obtaining d as shown in Expression [17] below. Finding the root further involves using a Taylor expansion to the $6^{th}$ order, to approximate Equation [15b] as shown in Expression [18] below. With the initial guess from Equation [17], the d value can be found from Equation [16] with the approximation of Equation [18] by a root-finding algorithm, for instance, the Muller's method. Finally, to find the accurate d, Equation [16] is solved without approximation in the integration, based on the approximate d value obtained from the previous estimates.

$$\text{imaginary part}\left(\int_0^{s_1} e^{i\theta(s)} ds\right) - (x_f - x_0) = 0 \quad [16]$$

$$d \approx \frac{32}{s_1^4}\left[2\sin^{-1}\left(\frac{x_f}{s_1}\right) - (\theta_f + \theta_0)\right] \quad [17]$$

$$\int_{-0.5}^{0.5} dt\, e^{i(k_0 t + k_1 t^2 + k_2 t^3 + k_3 t^4)} \approx 1 - \frac{k_0^2}{24} - \frac{1}{160}\left(2k_0 k_2 + k_1^2 - \frac{k_0^4}{12}\right) - \quad [18]$$

$$\frac{1}{896}\left(2k_1 k_3 + k_2^2 - \frac{2k_0^3 k_2 + 3k_0^2 k_1^2}{6} + \frac{k_0^6}{360}\right) +$$

$$i\left[\frac{k_1}{12} + \frac{1}{80}\left(k_3 - \frac{1}{2}k_0^2 k_1\right) - \frac{1}{2688}\left(3k_0^2 k_3 + 6k_0 k_1 k_2 + k_1^3 - \frac{1}{4}k_0^4 k_1\right)\right]$$

The third step in finding the two parameters (d, $s_1$) from Equation [14] is to find the $s_1$ range [$s_{10}$, $s_{11}$] such that the constraint in ($z_f$-$z_0$) is bracketed by gradually increasing $s_1$ value from $s_{1min}$, as shown in Equations [19a]-[19c] below. A bisection root-finding algorithm can be used to find $s_1$ from Equation [19c].

$$F(s_1) = \text{real part}\left(\int_0^{s_1} e^{i\theta(s)} ds\right) - (z_f - z_0) \quad [19a]$$

$$F(s_1 = s_{10}) \times F(s_1 = s_{11}) \leq 0 \quad [19b]$$

$$F(s_1) = 0 \quad [19c]$$

Figure 11:
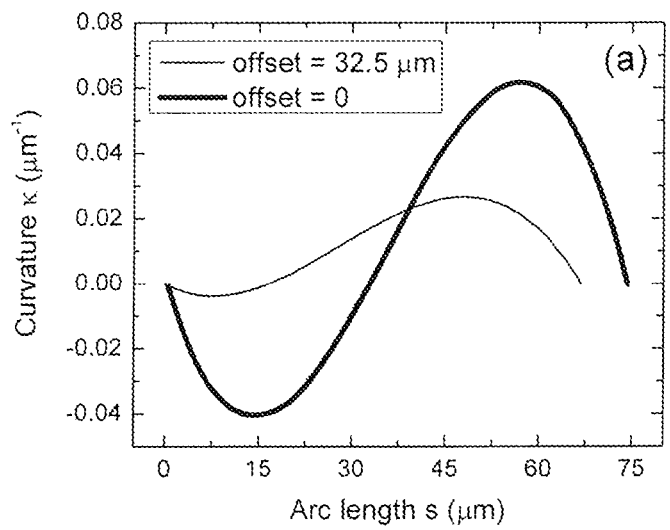
FIGS. 11-14 are graphs showing curvature and geometry of bent waveguide configurations according to example embodiments.
Figure 12:
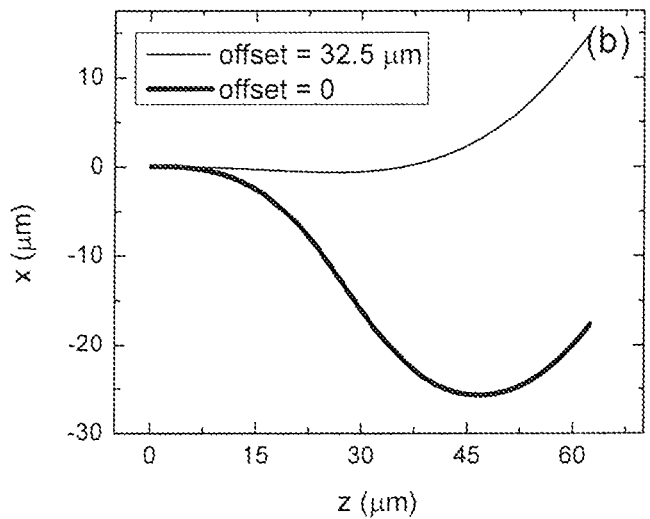

Following the three steps described above, the two parameters (d, $s_1$) are determined, and therefore, the spiral path that connects the two end-points is found. The graphs in FIGS. 11 and 12 show the paths for two practical instances. The coordinate system is centered at the start point ($z_0$, $x_0$)=(0, 0). The end point ($z_f$, $x_f$) is determined as shown in Equations [20a] and [20b] below.

$$z_f = H - L_{end} \cos(\theta_f) \quad [20a]$$

$$x_f = \text{offset} - L_{end} \sin(\theta_f) \quad [20b]$$

In one example, the total height of the magnetic slider is 180 µm. In such a case, 100 µm will be used for the waveguide input coupler, so the height of the bent waveguide plus output height H=80 µm (see H in FIG. 3, which extends from start point 320 to the media-facing surface 310). The length of the output waveguide $L_{end}$=25 µm and $\theta_f$=π/4. The total bend loss is calculated, assuming $W_0$=$W_1$=0.6 µm (single-mode waveguide). Two cases, offset=32.5 µm and offset=0 (see offset 322 in FIG. 3), are displayed in the graphs of FIGS. 11 and 12. Note that the total offset between the energy source and the also includes the length of the 45 degree output waveguide, which is not shown in these graphs. The graph in FIG. 11 shows curvature along the path and the graph in FIG. 12 shows the polynomial curve to connect the input and output waveguide section at the different offsets. At the offset=32.5 µm, the minimum radius of curvature $R_{min}$=37.6 µm, total bend loss Γ is negligible, 0.06%; at offset=0, $R_{min}$=16.1 µm, the total loss Γ is still very small, 0.8%.

Figure 13:
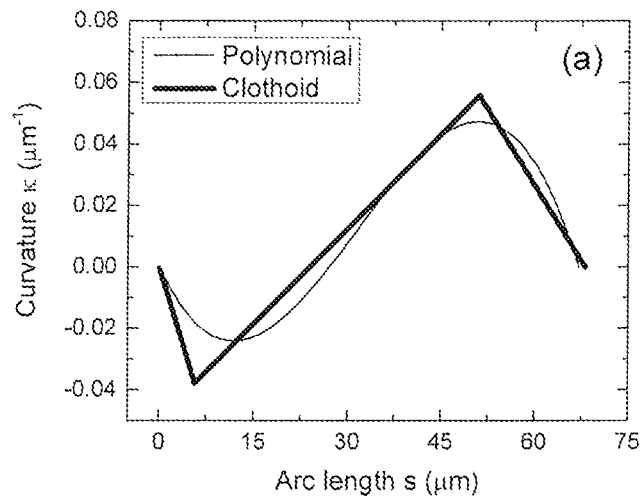
Figure 14:
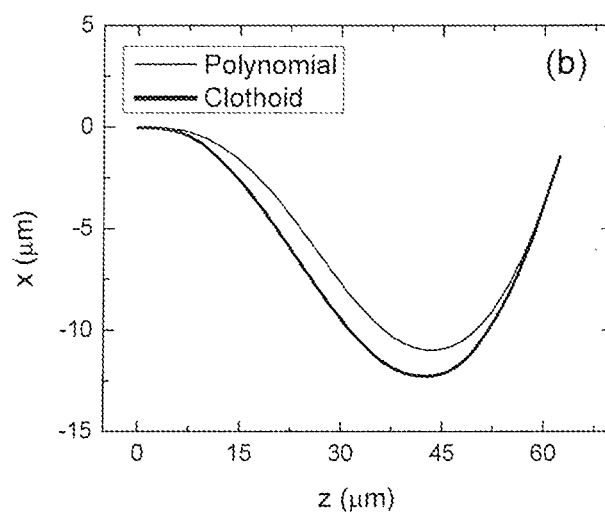

To demonstrate the performance of using a polynomial spiral for connection, a path with Euler (clothoid) spiral connection is also calculated. At offset<40 µm, at least three clothoid curves will be needed to connect the input to output waveguide. The graphs in FIGS. 13 and 14 shows the comparison for offset=16.25 µm and offset=0. It is evident that the connection using a polynomial spiral is superior to that of clothoid curves, because the path using the polynomial spiral has lower curvature and shorter path length. The total bend loss using clothoid curves is about two times of that using polynomial spiral.

Figure 15:
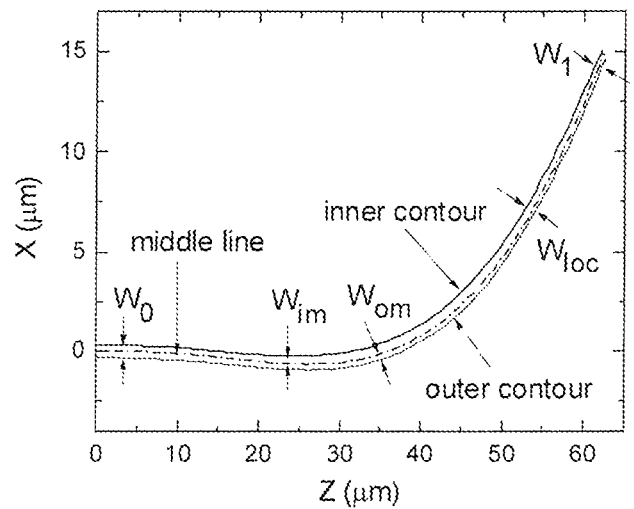
FIG. 15 is a graph showing inner, middle, and outer contours of a bent waveguide according to an example embodiment.

The width of the curved waveguide may vary between where it couples to the input and output waveguides. In such a case, the inner and outer contour of the bent waveguide can be obtained in two ways, (1) both inner and outer contour are independently generated with a polynomial spiral or (2) the middle line of the waveguide is generated using a polynomial spiral while the inner and outer contour are generated based on the local waveguide width, $W_{loc}$. The normal distance from inner contour to the middle line, $W_{im}$, might differ from that between the outer contour and the middle line, $W_{om}$, as shown in the graph of FIG. 15.

Since the path is designed to minimize inter-mode coupling, a bent waveguide with multi-mode sections could be used to mitigate the impact of sidewall roughness due to imperfect fabrication. One simple model in local core width is its linear dependence on local curvature, CR, as shown in Equations [21a] and [21b] below, where $W_{max}$ (≥$W_0$) is the core width at the location of maximum curvature, $CR_{max}$. To mitigate the phase wave-front deformation, which results in radiation loss and inter-modal coupling, the waveguide could use core widths as shown in Equations [22a]-[22b]. In practice, the optimal $W_{max}$ value can be determined experimentally $$W_{loc} = W_0 + (W_{max} - W_0) \times \left|\frac{CR}{CR_{max}}\right| \quad [21a]$$

$$W_1 = W_0 \quad [21b]$$

$$\text{If } CR > 0, W_{im} \geq W_{om}: W_{om} = \frac{W_0}{2}, W_{im} = W_{loc} - W_{om} \quad [22a]$$

$$\text{If } CR < 0, W_{im} \leq W_{om}: W_{im} = \frac{W_0}{2}, W_{om} = W_{loc} - W_{im} \quad [22b]$$

Figure 16:
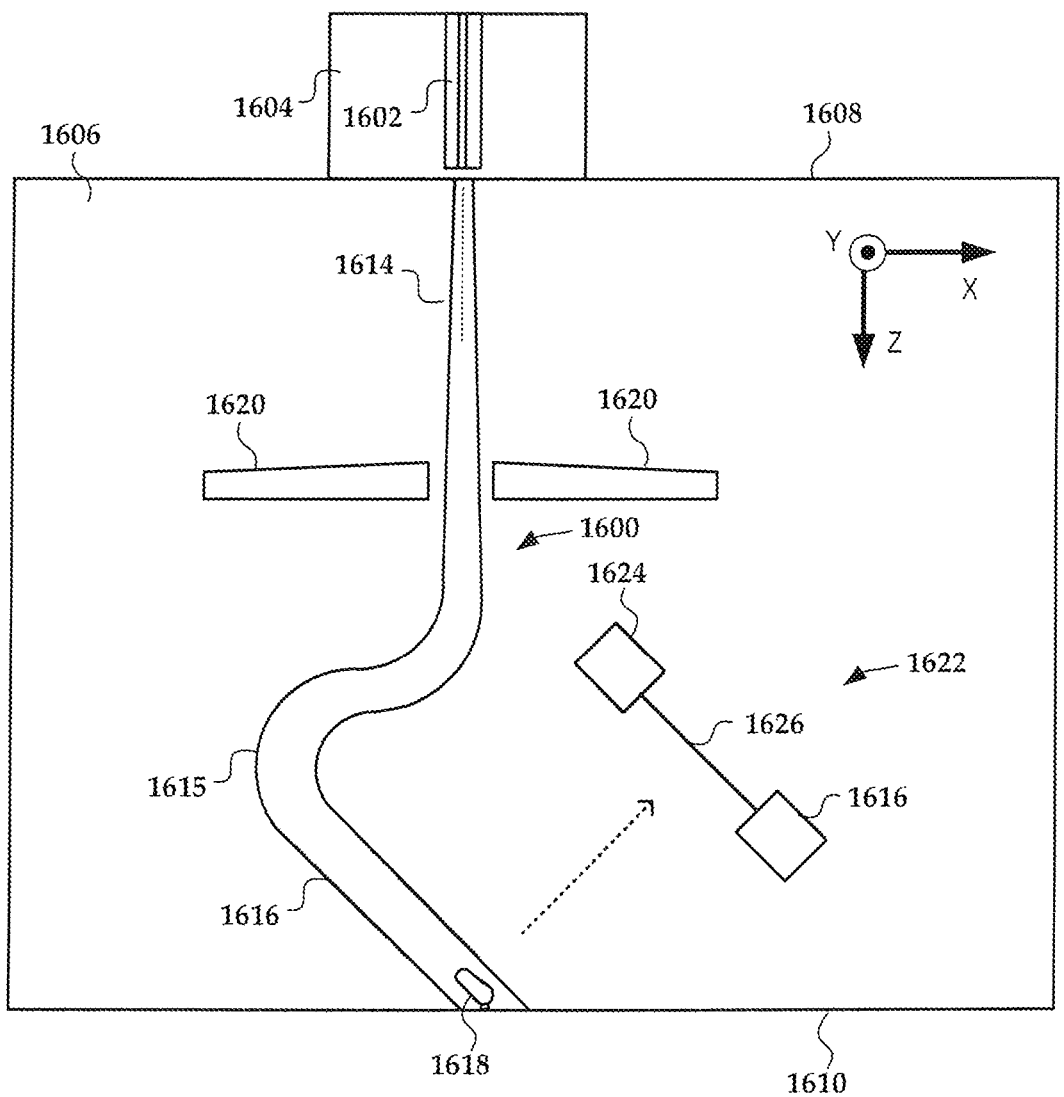
FIGS. 16 and 17 are a substrate-parallel plane views showing geometry of slider-integrated waveguide systems according to other example embodiments.

In FIG. 16, a substrate-parallel plane view shows geometry of a slider-integrated waveguide system 1600 according to another example embodiment. An energy source 1602, e.g., an edge-emitting laser diode, is mounted on a submount 1604. The submount 1604 is on a top surface 1608 of a slider body 1606. The top surface 1608 is opposite a media-facing surface 1610, which is held near a magnetic recording medium while recording data. The energy source 1602 launches light into a tapered input waveguide 1614, which is coupled to a bent waveguide 1615 and an output waveguide 1616. The input coupler 1614 tapers from a smaller cross track width proximate the energy source 1602 to a wider cross track width proximate the bent waveguide 1615. The waveguide core dimension of input, bent, and output waveguides 1614-1616 may be chosen to support single mode propagation.

Light propagates through the waveguide system 1600 and excites a plasmonic NFT 1618. The NFT 1618 is located an oblique angle to the x-axis and includes an enlarged portion and a peg extending therefrom normal to the media-facing surface 1710. The input waveguide 1614 is nearly normal to the top surface 1608, and light exiting from the light source 1602 is nearly normal to this surface for coupling efficiency from the energy source 1602 to the input waveguide 1614. The output waveguide 1616 near the media-facing surface is tilted from the media-facing surface 1610 normal at the oblique angle to suppress the return light reflected from the medium into the light source 1602.

In this embodiment, there is a small or zero offset between the output of the energy source 1602 and the NFT 1618. This is achieved by an s-shaped bend in the bent waveguide 1615. This embodiment may include materials and features described for other embodiments, including an assistant layer on a substrate-parallel side of the input waveguide 1614, polynomial spirals in the bent waveguide 1615, varying width in the bent waveguide 1615, etc. Also seen in this embodiment are two or more light blockers 1620 on either side of the input waveguide 1614 and/or bent waveguide 1615. The light blockers could be formed as gratings and/or from reflective metals, such Au, Cu, Al and/or from partially reflective and partially absorptive materials, such as NiFe and NiFeCo. Similar light blockers may be used in other embodiments described herein, e.g., as shown in FIGS. 3 and 17.

A bolometer 1622 is also shown in FIG. 16. The bolometer includes electric pads 1624 and a wire 1626 that senses illumination near the NFT 1618. For example, the wire 1626 may have a high temperature coefficient of resistance, therefore will change it resistance in response to heating from the light reflected from the media-facing surface 1610. The pads 1624 may be formed from conductive materials such as Cu, Au, etc., and the wire 1626 may be formed from a material such as Ta, W, etc. A bolometer of this configuration may used by other embodiments described herein, e.g., as shown in FIGS. 3 and 17.

Figure 17:
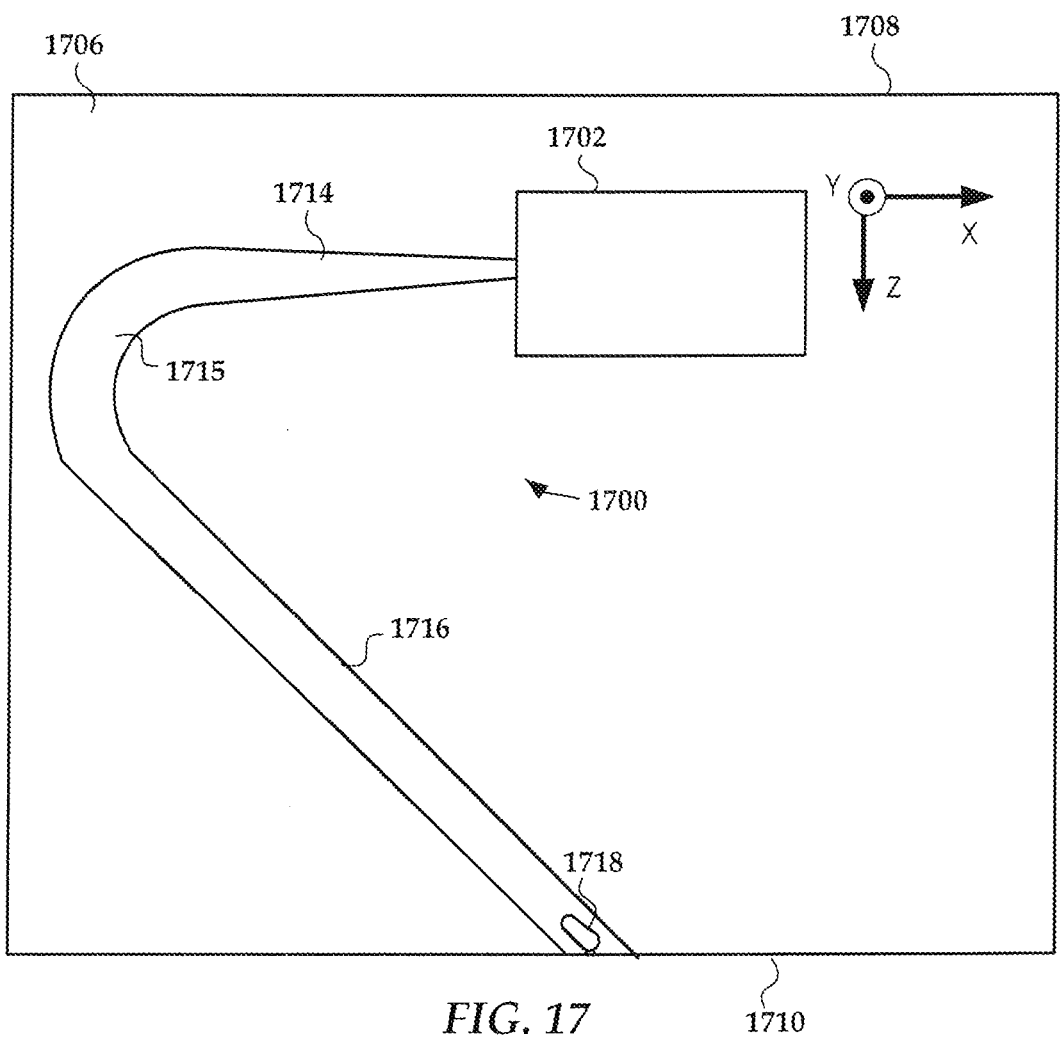

In FIG. 17, a substrate-parallel plane view shows geometry of a slider-integrated waveguide system 1700 according to another example embodiment. An energy source 1702, e.g., an edge-emitting laser diode or vertical-emitting laser diode, is mounted on a substrate-parallel surface, e.g., a trailing edge of a slider body 1706. For example, the energy source 1702 may be mounted on the trailing edge and launch light into a grating or other coupling feature formed on the trailing edge. In other configurations, the trailing edge may have a recess or pocket in which the light source 1702 is mounted, and a tapered input waveguide 1714 extends to an edge of the recess/pocket where it is coupled to the output of an edge-emitting laser diode.

The energy source 1702 launches light into the input waveguide 1714, which is coupled to a bent waveguide 1715 and output waveguide 1716. The input coupler 1714 tapers from a smaller cross track width proximate the energy source 1702 to a wider cross track width proximate the bent waveguide 1715. The input coupler 1714 may extend parallel to a top surface 1706 and a media-facing surface 1710. Light propagates through the waveguide system 1700 and excites a plasmonic NFT 1718 located an oblique angle to the x-axis. The NFT includes an enlarged portion and a peg extending therefrom normal to the media-facing surface 1710. The output waveguide 1716 near the media-facing surface 1710 is tilted from the media-facing surface normal at the oblique angle to suppress the return light reflected from the recording medium into the light source 1702.

In this embodiment, may be a significant or zero offset between the output of the energy source 1702 and the NFT 1718. This embodiment may include materials and features described for other embodiments, including an assistant layer on a substrate-parallel side of the input waveguide 1714, polynomial spirals in the bent waveguide 1715, varying width in the bent waveguide 1715, etc.

While the above examples have shown single mode, $TE_N$) input and output waveguides, the above embodiments may also be used for other waveguide modes in the input and/or output modes. For example, some NFTs may use a fundamental transverse magnetic mode ($TM_{00}$) for near-field transducer excitation. A $TM_{00}$ may be used for NFTs that have, for example, has a triangular shape, called a plasmonic generator. The embodiments above may also be used for a higher order TE mode, for instance, a first higher-order $TE_{10}$ mode. In such a case, a mode converter may be used to convert a fundamental mode to a higher-order TE or TM mode. In some configurations, the bent waveguide may be configured to perform this mode conversion.

Figure 18:
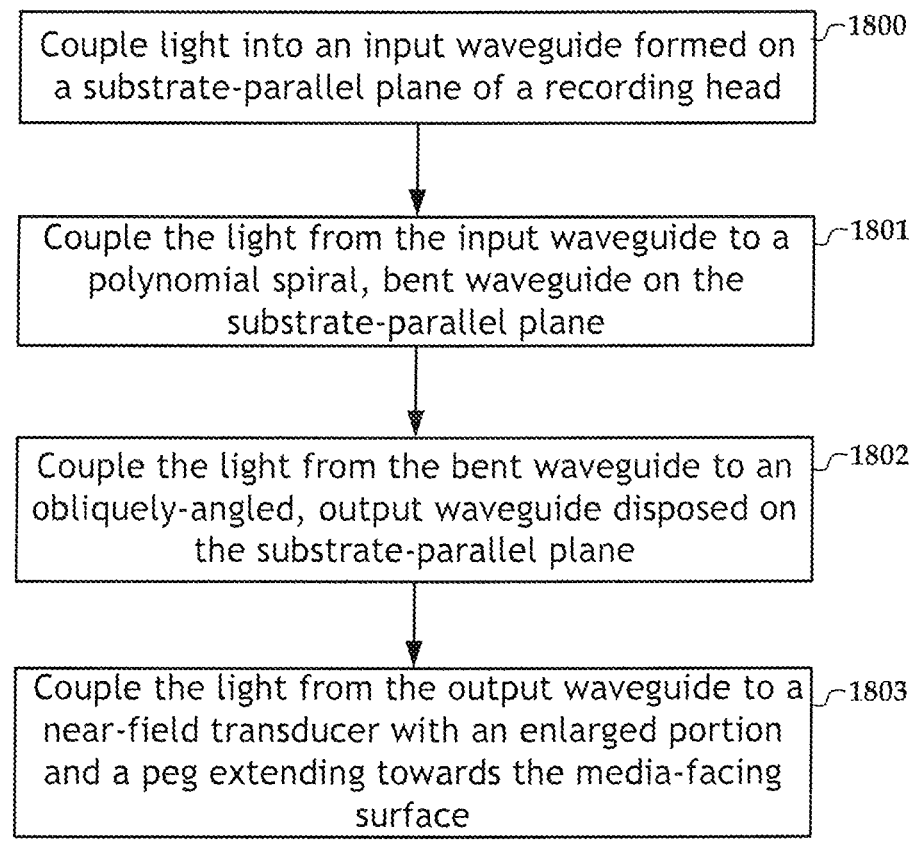
FIG. 18 is a flowchart illustrating a method according to an example embodiment.

In FIG. 18, a flowchart illustrates a method according to an example embodiment. The method involves coupling 1800 light into an input waveguide formed on a substrate-parallel plane of a recording head. The light is coupled 1801 from the input waveguide to a bent waveguide on the substrate-parallel plane. The bent waveguide has a polynomial spiral shape. The light from the bent waveguide is coupled 1802 to an output waveguide disposed on the substrate-parallel plane. The output waveguide at an oblique angle to a cross-track line at an intersection of a media-facing surface of the recording head and the substrate-parallel. The light from the output waveguide is coupled 1803 to a near-field transducer comprising an enlarged portion oriented at the oblique angle and a peg extending from the enlarged portion towards the media-facing surface. The peg is at a normal angle to the cross-track line Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. A recording head, comprising:
   a near-field transducer located an oblique angle to a cross-track line at an intersection of a media-facing surface and a substrate-parallel plane of the recording head, the near-field transducer comprising an enlarged portion and a peg extending from the enlarged portion towards the media-facing surface at a normal angle;
   an input waveguide that receives energy from an energy source along the substrate parallel plane;
   an output waveguide that delivers the energy to near-field transducer at the oblique angle, the output waveguide oriented at the oblique angle to the cross track line; and
   a bent waveguide joining the input waveguide and the output waveguide, the bent waveguide comprising a polynomial spiral shape.

2. The recording head of claim 1, wherein the near-field transducer is offset from the energy source in a cross-track direction.

3. The recording head of claim 1, wherein the input waveguide extends to a top surface opposite the media-facing surface, the input portion oriented a right angle to the cross-track line.

4. The recording head of claim 1, wherein the input waveguide tapers from a smaller cross track width proximate the energy source to a wider cross track width proximate the bent waveguide.

5. The recording head of claim 1, further comprising a coupling assistant layer proximate a substrate parallel side of the input waveguide near the energy source, the coupling assistant layer matching a mode profile between the energy source and the input waveguide.

6. The recording head of claim 1, wherein the energy is coupled through the input waveguide, the bent waveguide, and the output waveguide in primarily a $TE_{00}$ mode.

7. The recording head of claim 1, wherein a width of the bent waveguide varies between the input waveguide and the output waveguide.

8. The recording head of claim 7, wherein the width of the bent waveguide varies based on local curvature.

9. The recording head of claim 7, wherein a first normal distance from an inner contour of the bent waveguide to a middle line of the bent waveguide differs from a second normal distance between an outer contour of the bent waveguide and the middle line.

10. The recording head of claim 1, wherein an inner and outer contour of the bent waveguide comprise different polynomial spirals.

11. The recording head of claim 1, wherein the oblique angle comprises a 45-degree angle.

12. The recording head of claim 1, wherein the energy source comprises an edge-emitting laser diode.

13. The recording head of claim 1, wherein the input waveguide is oriented parallel to the cross-track line, and wherein the energy source is mounted on a trailing edge of the recording head.

14. The recording head of claim 1, wherein the energy is coupled through the input waveguide, the bent waveguide, and the output waveguide in primarily a $TM_{00}$ mode.

15. A method comprising:
    coupling light from an energy source into an input waveguide formed on a substrate-parallel plane of a recording head;
    coupling the light from the input waveguide to a bent waveguide on the substrate parallel plane, the bent waveguide comprising a polynomial spiral shape;
    coupling the light from the bent waveguide to an output waveguide disposed on the substrate-parallel plane, the output waveguide at an oblique angle to a cross-track line at an intersection of a media-facing surface of the recording head and the substrate-parallel; and
    coupling the light from the output waveguide to a near-field transducer comprising an enlarged portion at the oblique angle and a peg extending from the enlarged portion towards the media-facing surface at a normal angle to the cross-track line.

16. The method of claim 15, wherein launching the light into the input waveguide comprises coupling the light in a $TE_{00}$ mode from a top surface of the recording head, the top surface facing opposite the media-facing surface.

17. A recording head, comprising:
    a top surface and a media-facing surface opposite the top surface;
    a tapered input waveguide that receives light from an energy source at the top surface and extends at a normal angle towards the media-facing surface;
    a bent waveguide comprising a polynomial spiral shape and coupled to the input waveguide;
    an output waveguide coupled to the bent waveguide, the output waveguide oriented at an oblique angle to a cross-track line at an intersection of the media-facing surface and a substrate-parallel plane of the recording head; and
    a near-field transducer coupled to receive the light from the output waveguide near the media-facing surface, the near-field transducer comprising an enlarged portion oriented at the oblique angle a peg extending from the enlarged portion at the normal angle.

18. The recording head of claim 17, wherein a width of the bent waveguide varies between the input waveguide and the output waveguide based on local curvature.

19. The recording head of claim 18, wherein an inner and outer contour of the bent waveguide comprise different polynomial spirals.

20. The recording head of claim 18, wherein a first normal distance from an inner contour of the bent waveguide to a middle line of the bent waveguide differs from a second normal distance between an outer contour of the bent waveguide and the middle line.

* * * * *